Figure 1:
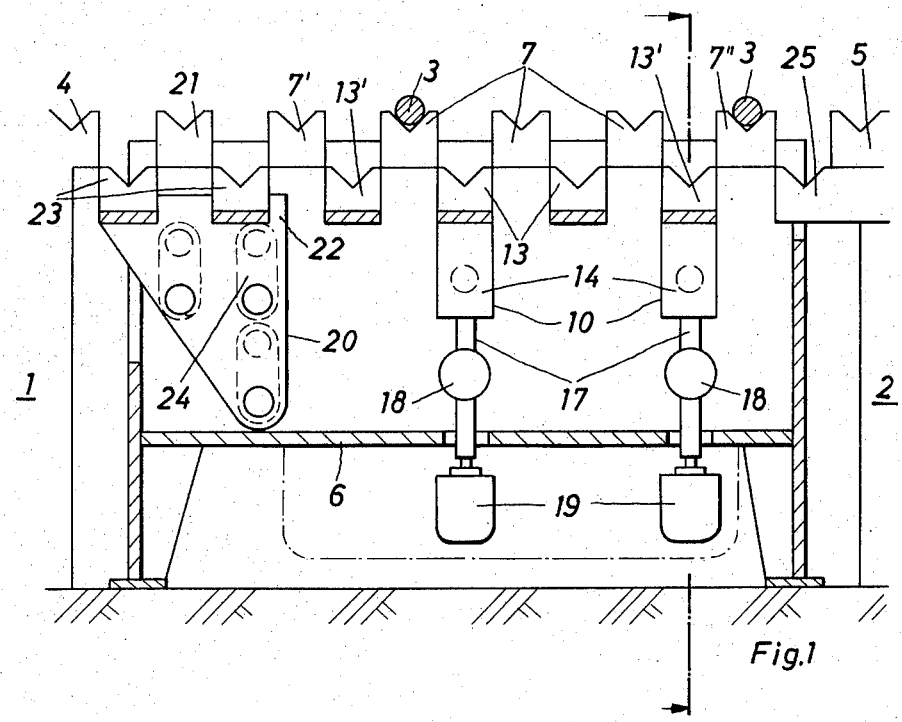

United States Patent [19]
Stengel et al.

[11] 3,859,038
[45] Jan. 7, 1975

[54] METHOD OF USING WORKPIECE TRANSPORTING APPARATUS

[75] Inventors: Edgar Stengel, Wuppertal-Hahnerberg; Friedhelm Emde, Huckeswagen, both of Germany

[73] Assignee: AEG-Elotherm, G.m.b.H., Remscheid-Hasten, Germany

[22] Filed: Mar. 15, 1974

[21] Appl. No.: 451,608

[30] Foreign Application Priority Data
Mar. 15, 1973  Germany............................ 2312902

[52] U.S. Cl. .................. 432/5, 214/18 R, 432/128
[51] Int. Cl. ............................................ F27b 9/14
[58] Field of Search ............... 432/128, 121, 130, 5; 214/18 R

[56] References Cited
UNITED STATES PATENTS
2,307,413   1/1943   Loux ................................ 214/18 R
3,677,423   7/1972   Tollefsrud ........................ 214/18 R Primary Examiner—John J. Camby
Attorney, Agent, or Firm—Cushman, Darby & Cushman

[57] ABSTRACT

A process for heat treating workpieces in which workpieces inductively hardened on a first device are conveyed automatically to a heat furnace by a storage and conveying device having a plurality of nests for receiving workpieces, transfer devices for transferring workpieces from one occupied nest to the next unoccupied nest, and occupancy detectors associated with each nest. When the occupancy detector associated with the nest which feeds the furnace indicates occupancy for longer than a given time, indicating breakdown of the furnace, feed of further workpieces to the inductively hardening device is interrupted and the workpieces already in that machine are stored on the storage and conveying device.

1 Claim, 3 Drawing Figures

METHOD OF USING WORKPIECE TRANSPORTING APPARATUS

The invention deals with an apparatus and process for treating and transporting workpieces.

Devices for treating, especially for inductive hardening, workpieces such as axles, shafts, etc., are typically equipped, as known from U.S. Pat. No. 3,446,375, with a pair of spiders each having a pair of supporting arms for gripping a workpiece. Each arm includes two spindle sleeves moveable against each other for clamping the workpieces while they are progressively indexed from a clamping station through one or more treatment stations to an unclamping station. With such processing devices, often it is the case that whenever processing is interrupted or delayed, the workpieces already under treatment in the device are ruined.

This is particularly true also with devices for inductive hardening as disclosed in the above mentioned patent, for a workpiece which is being inductively heated or had been heated and, because of an interruption of the treatment, cannot be quenched within a predetermined time period. Such a workpiece thereafter cannot be tempered correctly and is scrap.

In order to decrease the possibility of a workpiece becoming useless with processing devices of the type mentioned, an apparatus for treatment, especially for inductive hardening of workpieces, has already been proposed in which an unsuccessful clamping process can be stopped and the workpiece to be clamped held back, without disturbing or delaying the normal course of processing of the workpieces already in the processing device at that point in time.

Furthermore, combinations with two operation devices for separate processing of objects are known, in case of which the two operating devices accomplish their operations on the individual objects, one after the other, and are connected with one another by means of a storage and conveying mechanism which is located between the two devices and which transfers the objects from a first device to a second.

These types of storage and transportation arrangements cause the second device to be charged with a workpiece even if the first ceases working. Whenever the first device resumes operation, objects are again supplied to the storage and the objects then advance in the storage in order to fill the empty spaces which have occurred during shutdown of the first machine.

Furthermore it has been known in case of installations of this type to use the storage and conveying device between the two operating devices as an intermediate storage when the second device stops.

The known arrangements however suffer from the disadvantage that only short term operational breakdowns of the second device can be compensated by means of the storage and conveying device. During the occurrence of such breakdowns, operation of the first device continues and the workpieces treated or processed in this device are stored in the succeeding transportation device. If the storage capacity of the conveying device is exhausted, the first processing device must be stopped and the processing of the workpieces in that device must be interrupted, possibly ruining several workpieces.

A concrete example is an arrangement in which the first device carries out an inductive hardening of the workpieces to be treated and a tempering furnace is serially connected to that device for further thermal treatment of the workpieces. Whenever operation of the tempering furnace is disturbed, then after the storage capacity is exhausted, the hardening machine must be stopped and thus the thermal treatment of the workpieces must be interrupted. This invention resolves that problem.

Figure 2:
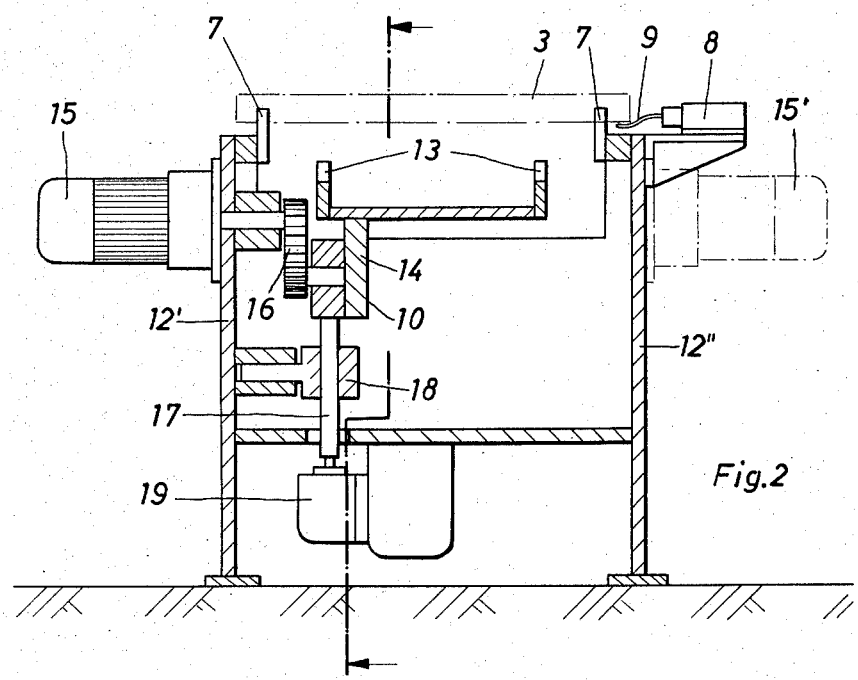
Figure 3:
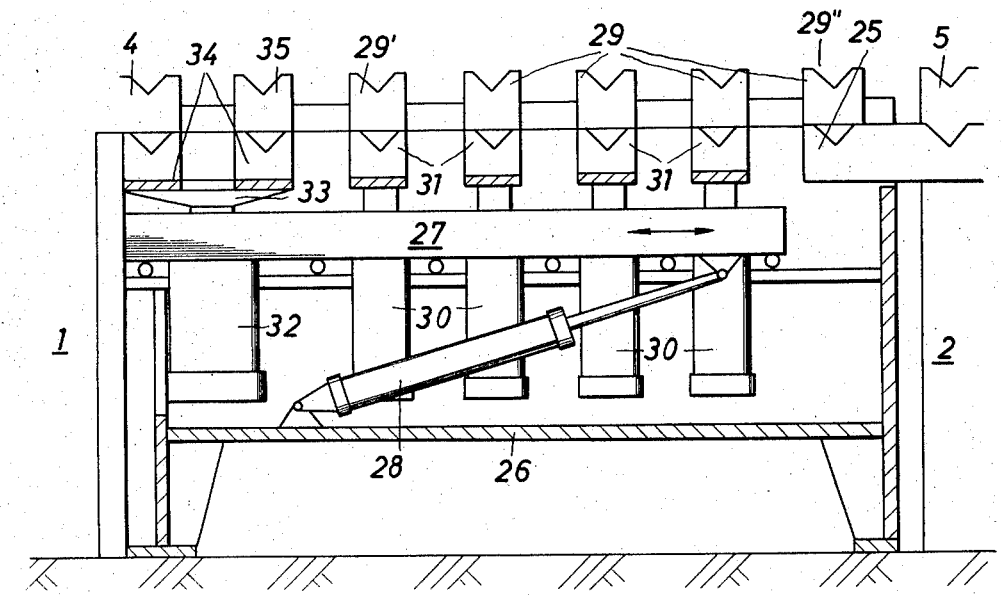

The invention is explained subsequently on the basis of FIGS. 1 and 2 which show a first embodiment, by way of example a storage and conveying arrangement for carrying out the process of the invention for axles, shafts, etc., schematically in longitudinal section (FIG. 1) and in cross section (FIG. 2). FIG. 3 shows a second embodiment.

In FIGS. 1–3, a storage and conveying arrangement is disposed between a conventional apparatus 1 for inductive hardening and a continuous stress relieving, conventional furnace 2 and conveys workpieces 3, for example axles or shafts, from outlet 4 of hardening apparatus 1 to inlet 5 of stress relieving furnace 2. The storage arrangement includes a frame 6 supporting along the conveying path several successive nests for workpieces 7, 7' and 7''. Each of these workpiece nests is provided with an occupancy detector 8 (FIG. 2) having sensor 9 which, in case of occupancy of the associated nest, by workpiece 3 is depressed to trigger a corresponding occupancy signal. Transfer devices 10 serve for conveyance of workpieces 3 from one nest to the next, whereby each transfer device transfers workpieces out of one of its assigned nests to the nest which is next in the direction of conveyance. Altogether four transfer devices 10 are needed for five nests of the illustrated embodiment.

Two of these transfer devices (as viewed in the direction of conveyance) are mounted on the left-hand lateral wall 12' (FIG. 2) of frame 6. They serve for the conveyance of the workpieces from the second to the third nest for workpieces, viewed in the direction of conveyance, and from the fourth to the fifth nest respectively. The other two transfer devices, which are mounted on the right-hand lateral wall 12'' of the frame 6 and are shown only partially in the figures, take care of transference of the workpieces from the first to the second and from the third to the fourth nests respectively.

Each transfer device has a support 14 mounting a workpiece support 13. Support 14 is connected to crank 16 mounted for rotation in frame 6 and driven by a geared motor 15 or 15' (FIG. 2). Crank 16 also is rotatably coupled to a reciprocating piston rod element 17 which reciprocates in rotatable guide 18. A terminal switch 19 is operable from the lower end of rod element 17 and controls the associated transfer device. Of the two transfer devices disposed on the right-hand laterla wall 12'' (as viewed in the direction of conveyance) of frame 6 in FIG. 1, only nests 13' for the workpieces and in FIG. 2, the disposition of the geared engines 15' can be seen.

For transfering workpieces from outlet 4 of hardening arrangement 1 to workpiece nest 7' of the storage arrangement lifter conveyor 20 with a stationary nest 21 for workpieces, as well as a lifter 22 are provided. Lifter 22 is equipped with two nests 23 for workpieces and is connected to crank gear 24. For the transfer of work pieces from the last (viewed in the direction of conveyance) nest 7'' to inlet 5 of stress relieving furnace 2, the latter is equipped with a transfer device 25 operating in the same manner as lifter conveyor 20.

In standard operations, for discharge of a completely hardened workpiece, the drive of the crank gear 24 is started at the outlet 4 of the hardening arrangement 1. Lifter 22 then carries out two rotations, starting from its rest position shown in FIG. 1 and, under control by a suitable terminal switch, is again stopped in that rest position. At the same time, the workpiece is transferred from the place of deposite of the work piece at the outlet 4 of the hardening arrangement 1 by way of the stationary nest 21 into the first (in the direction of conveyance) next 7' of the storage arrangement. Whenever there is no occupancy signal from the second, i.e., the next following-in direction of conveyance nest 7 for workpieces, the occupancy signal pertaining to nest 7' will start the geared engine 15 of the first transfer apparatus 10' as a result of which crank 16 is turned clockwise. At the same time, nest 13, attached to carrier 14, is guided on a oval, closed path to sweep the first and second nests for workpieces and is finally stopped by operation of the terminal switch 19 in its rest position as shown in FIG. 1. Guide 18 retracts as nest 13 follows the oval path.

During this conveying step, the workpiece is lifted from the first nest 7' and deposited in the next following (in the direction of conveyance) nest. The occupancy signal triggered thereby of the second nest for workpieces, whenever there is no occupancy signal from the third nest, on its part releases one conveying step of the second transfer apparatus which transfers the workpiece from the second to the third nest. This process is now continued in the direction of conveyance, from nest to nest until the workpiece has reached the last nest for workpieces 7' viewed in direction of conveyance. The occupancy signal from this last nest 7'' serves as clearance signal for the transfer apparatus 25, by which then the throughput cycle of the stress relieving furnace is released.

If now, for example, because of a defect in the continuous-heating furnace the transfer of the workpiece to the furnace cannot be accomplished within a predetermined time after deposit of the workpiece in the last nest 7'' for workpieces then controlled by the reaction of a time release and controlled by the occupancy signal of the last nest 7'' the feed-in of workpieces to the hardening arrangement 1 will be interrupted, after which the workpieces already being processed at this time in the hardening arrangement 1 are completely hardened and are gradually fed by way of the outlet 4 of the hardening arrangement to the storage device. These workpieces pass through the storage device as in standard operation, but they come to rest in the last unoccupied nest, so that finally all nests for workpieces are occupied.

If after resumption of the tempering furnace operation a workpiece from the last nest 7'' for workpieces is delivered by means of the transfer apparatus 25 to inlet 5 of the continuous heating furnace, the remaining workpieces deposited in the storage device, temporally somewhat delayed from workpiece to workpiece and in relation to one another, then move on by one conveying step. This process is repeated until the storage device is emptied and until then there is no occupancy signal from the last nest 7'' for workpieces for a predetermined period of time. If this occurs, a signal for the continuation of the workpiece removal is delivered to the inlet of the hardening arrangement and the operation resumes its normal course again from that point.

According to a variation of the storage device according to FIG. 3 and deviating from the embodiment of FIGS. 1 and 2, a carriage 27 is provided in frame 26 which can be shifted back and forth with the help of a pneumatic adjusting mechanism 28 between two end positions removed from one another by the middle distance of two adjacent, stationary nests 29 for workpieces. On carriage 27 a pneumatically operable lifting element 30 with a nest 31 for workpieces is provided for each transfer device. Either carriage 27 or lifting elements 30 are equipped with switches which guarantee a repeating back signal of the pertinent occupied terminal positions of carriage 27 or the lifting elements 30 and which cause the delivery of signals for locking the movement of the carriage during the movement of the lifting element as well as of the movements of the lifting elements during movement of carriage 27. On the carriage 27, subsequent to the outlet 4 of the hardening arrangement 1, another lifting element 32 has also been disposed which acrries a lifter 33 with two nests 34 for workpieces, and which, with the carriage 27, the nest for workpieces at the outlet 4 of the hardening arrangement 1, as well as with the stationary nests 35 and 29' constitutes a lifter conveyor.

The carriage 27 (as shown in FIG. 3) in the rest position of the described transfer device is also in its first end position toward the outlet 4 of the hardening arrangement and the lifting elements 30 and 32 in their lower end positions. In standard operation and upon deposit of a completely hardened work piece at the outlet of the hardening arrangement, the lifter conveyor constitutes by the carriage 27, the lifting element 32 with lifter 33 and the nests 34, 35 and 29' for workpieces are released for carrying out two conveying steps, whereby the lifter 33 during each conveying step describes a translational movement along the path of a rectangle and then again comes to rest in the starting position shown in FIG. 3. At the same time the workpiece is transferred from the outlet 4 of the hardening arrangement 1 by way of stationary nest 35 to the first (in the direction of conveyance) nest 29' of the storage device. The transfer of the workpieces from one nest of the storage arrangement to the next now takes place in the following manner.

When there is an occupancy signal in relation to one nest 29 (or 29') for workpieces and whenever there is no occupancy signal for the next following (in direction of conveyance) nest for workpieces, lifting element 30 located below the occupied nest 29 is moved from the lower to the upper end position. The carriage is then moved in the direction of conveyance into its second end position located toward the outlet of the storage device and the lifting element 30 with a workpiece thereupon is moved into its lower end position. Finally carriage 27 is again transferred into its starting position by a movement counter to the conveying direction. The translational movement of the lifting element 30 with nest 31 carried thereby causes the transfer of the workpiece from one nest to the next in which the next occupancy signal releases the next conveying step for the same workpiece. In this way workpieces are also conveyed through the storage device by means of the collective transfer apparatus of FIG. 3 analogously as in case of the storage device according to FIGS. 1 and 2.

If there is no discharge of workpieces at the outlet of the arrangement, all nests of the storage device will gradually be occupied. In the case that the workpieces to be conveyed occupy several successive nests, as for example prior to emptying of the storage device fully occupied by workpieces, there will be however the following course of the conveying steps slightly changed as compared to the storage device with individual transfer arrangements. In case of a fully occupied storage arrangement one conveying step is released whenever a workpiece is taken from the last (in the direction of conveyance) nest for workpieces and the corresponding occupancy signal disappears. The disappearance of this occupancy signal now releases a conveying step for the workpiece deposited in the penultimate nest, i.e., the pertinent lifting element is transferred from its lower to its upper end position and thereby lifts the workpiece from this penultimate nest, whereby the pertinent occupancy signal disappears which triggers the upward movement of the next lifting element in a direction opposite to the conveying direction. This process is repeated until all workpieces have been lifted from the nests 29 and 29' for workpieces of the storage arrangement. The forward movement of the carriage 27 is initiated only then because of the mutual locking of the horizontal and vertical movement for the continuation of the conveying step. The further course of the conveying step takes place from there on just as in case of a conveying step with a single workpiece, in contrast to the first variation of the storage arrangement, simultaneously for all workpieces.

Any simple and suitable circuitry can be employed for controlling the movement of workpieces as a function of detected nest occupancy. Many changes in the above described embodiment of the invention can, of course, be carried out without departing from the scope thereof. Accordingly, that scope is intended to be limited only by the scope of the appended claims.

What is claimed is:

1. A process for the operation of an arrangement for the heat treatment of workpieces consisting of a first automatically operating heat treatment apparatus to which the workpieces are fed on the input side in which they are treated and from which they are removed on the outlet side, a second apparatus to which are fed gradually the work pieces taken from the first apparatus, on the input side, and of a storage and conveying arrangement, disposed between the outlet of the first and the inlet of the second apparatus, for the conveyance of the workpieces, the storage and conveying arrangement having a series of nests for workpieces disposed along its conveying path in succession and an occupancy detector associated each nest for indicating occupancy of the associated nest and, between locally adjacent nests for workpieces, transfer device for transferring workpieces from one nest to the next following nest in the direction of conveyance, and means for controlling the transfer devices when the nest located behind in the direction of conveyance is occupied, and the succeeding nest is unoccupied in the direction of conveyance, the steps including, in case of breakdown of the feed for the workpieces to the inlet of the second device, signaling the workpiece feed to the inlet of the first device to cease operation when the occupancy detector associated with the nest for workpieces lying in front in the direction of conveyance indicates occupancy for greater than predetermined time period, continuing treatment of the workpieces which at this time are in the first apparatus and already under treatment until finished, transferring those workpieces when completed to the storage and conveying device and transferred in said device by the transfer devices to the last, in the direction of conveyance, unoccupied nest.

* * * * *